United States Patent
Reutler et al.

(10) Patent No.: US 9,919,497 B2
(45) Date of Patent: Mar. 20, 2018

(54) SUBSTRATE COMPRISING A STACK HAVING THERMAL PROPERTIES

(75) Inventors: Pascal Reutler, Paris (FR); Eric Petitjean, Les Lilas (FR); Eric Mattmann, Paris (FR); Pierre-Alain Gillet, Mariel-Marly (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 1725 days.

(21) Appl. No.: 12/281,480

(22) PCT Filed: Mar. 6, 2007

(86) PCT No.: PCT/FR2007/050882
§ 371 (c)(1),
(2), (4) Date: Jan. 2, 2009

(87) PCT Pub. No.: WO2007/101964
PCT Pub. Date: Sep. 13, 2007

(65) Prior Publication Data
US 2009/0197077 A1    Aug. 6, 2009

(30) Foreign Application Priority Data
Mar. 6, 2006  (FR) ...................... 06 50771

(51) Int. Cl.
*B32B 17/00*  (2006.01)
*C03C 17/36*  (2006.01)
*B32B 17/10*  (2006.01)

(52) U.S. Cl.
CPC .. *B32B 17/10174* (2013.01); *B32B 17/10229* (2013.01); *C03C 17/36* (2013.01);
(Continued)

(58) Field of Classification Search
CPC . C03C 17/36; C03C 17/3626; C03C 17/3644; C03C 17/366; C03C 17/3652;
(Continued)

(56) References Cited

U.S. PATENT DOCUMENTS 5,268,208 A * 12/1993 Krisko ................ C03C 17/3417
                                                            427/166
6,579,427 B1 * 6/2003 Arbab et al. ............. 204/192.27
(Continued)

FOREIGN PATENT DOCUMENTS

EP    0 718 250 A2    6/1996
EP    0 877 005 A1   11/1998
(Continued)

OTHER PUBLICATIONS

U.S. Appl. No. 12/933,240, filed Sep. 17, 2010, Reutler, et al.
(Continued)

*Primary Examiner* — Ramsey E Zacharia
(74) *Attorney, Agent, or Firm* — Oblon, McClelland, Maier & Neustadt, L.L.P.

(57) ABSTRACT

The invention relates to a substrate (10), especially a transparent glass substrate, provided with a thin-film multilayer comprising a functional layer (40) having reflection properties in the infrared and/or in solar radiation, especially a metallic functional layer based on silver or on a metal alloy containing silver, and two coatings (20, 60), said coatings being composed of a plurality of dielectric layers (24, 26; 64), so that the functional layer (40) is placed between the two coatings (20, 60), the functional layer (40) being deposited on a wetting layer (30) itself deposited directly onto a subjacent coating (20), characterized in that the subjacent coating (20) comprises at least one dielectric layer (24) based on nitride, especially on silicon nitride and/or aluminum nitride, and at least one noncrystalline smoothing layer (26) made from a mixed oxide, said smoothing layer (26) being in contact with said superjacent wetting layer (30).

15 Claims, 4 Drawing Sheets

(52) U.S. Cl.
CPC ........ *C03C 17/366* (2013.01); *C03C 17/3626* (2013.01); *C03C 17/3644* (2013.01); *C03C 17/3652* (2013.01); *C03C 17/3618* (2013.01); *Y10T 428/265* (2015.01)

(58) Field of Classification Search
CPC ............ C03C 17/3681; C03C 17/3618; B32B 17/10229; B32B 17/10174
See application file for complete search history.

(56) References Cited

U.S. PATENT DOCUMENTS

| | | | |
|---|---|---|---|
| 2002/0034641 A1 | 3/2002 | Ebisawa et al. | |
| 2003/0049464 A1 | 3/2003 | Glenn et al. | |
| 2005/0106397 A1* | 5/2005 | Krisko et al. | 428/432 |
| 2006/0083934 A1* | 4/2006 | Butz et al. | 428/434 |
| 2006/0141265 A1* | 6/2006 | Russo et al. | 428/426 |
| 2006/0240266 A1* | 10/2006 | Schicht et al. | 428/426 |
| 2009/0169846 A1 | 7/2009 | Siddle et al. | |

FOREIGN PATENT DOCUMENTS

| | | |
|---|---|---|
| FR | 2 856 627 | 12/2004 |
| WO | WO 01/81262 A1 | 11/2001 |
| WO | WO 2007/080428 A1 | 7/2007 |

OTHER PUBLICATIONS

European Office Action dated Apr. 20, 2010, in Patent Application No. 07 731 699.0 (with English-language translation).
Arbab, Mehran, "The Base Layer Effect on the D.C. Conductivity and Structure of Direct Current Magnetron Sputtered Thin Films of Silver", Thin Solid Films 381,published by Elsevier Science B.V., 2001, pp. 15-21.

* cited by examiner

SUBSTRATE COMPRISING A STACK HAVING THERMAL PROPERTIES

CROSS-REFERENCE TO RELATED APPLICATIONS

This application is a National Stage of PCT/JP07/50882 filed Mar. 6, 2007 and claims the benefit of FR 0650771 filed Mar. 6, 2006.

The invention relates to transparent substrates, especially those made of rigid mineral material such as glass, said substrates being coated with a thin-film multilayer comprising a functional layer of metallic type which can act on solar radiation and/or infrared radiation of long wavelength.

The invention relates more particularly to the use of such substrates for manufacturing thermal insulation and/or solar protection glazing. This glazing may be intended for equipping both buildings and vehicles, especially with a view to reducing air-conditioning load and/or preventing excessive overheating (glazing called "solar control" glazing) and/or reducing the amount of energy dissipated to the outside (glazing called "low-e" or "low-emissivity" glazing) brought about by the ever growing use of glazed surfaces in buildings and vehicle passenger compartments.

This glazing may furthermore be integrated into glazing units having particular functionalities, such as, for example, heated windows or electrochromic glazing.

One type of multilayer known for giving substrates such properties is composed of a metallic functional layer having reflection properties in the infrared and/or in solar radiation, especially a metallic functional layer based on silver or on a metal alloy containing silver.

This metallic functional layer is deposited in a crystalline form on a wetting layer that is also crystalline and that promotes the suitable crystalline orientation of the metallic layer deposited on it.

This functional layer is placed between two coatings made of dielectric material of the metal oxide or nitride type. The multilayer is generally obtained by a succession of deposition operations carried out using a vacuum technique, such as sputtering, optionally magnetically enhanced or magnetron sputtering. One, or even two, very thin film(s), known as "blocking coatings", may also be provided, this or these being placed directly under, over or on each side of each silver-based metallic functional layer—the subjacent coating as a tie, nucleation and/or protection coating, for protection during a possible heat treatment subsequent to the deposition, and the superjacent coating as a "sacrificial" or protection coating so as to prevent the silver from being impaired if a layer that surmounts is deposited by sputtering in the presence of oxygen or nitrogen and/or if the multilayer undergoes a heat treatment subsequent to the deposition.

Thus, the use of an amorphous layer based on a mixed zinc and tin oxide, which is directly in contact with the substrate, under a wetting layer based on zinc oxide is known from European patent application No. EP 803 481.

It turns out that when such an amorphous layer is not deposited directly onto the substrate but is inserted between at least one subjacent dielectric layer and a wetting layer, it makes it possible to modify the interface between the dielectric layer and the wetting layer located above and thus to significantly improve the crystallization of the wetting layer and also the crystallization of the metallic functional layer.

It has been found, surprisingly, that the integration of such an amorphous layer in the coating that is subjacent to the functional layer and provided with at least one nitride-based dielectric layer under this amorphous layer makes it possible to achieve a desired improvement in the crystallization of the functional layers and thus a desired improvement in the resistivity of the entire multilayer.

The object of the invention is therefore to remedy the drawbacks of the prior art, by developing a novel type of multilayer having layers of the type of those described above, which multilayer has an improved resistivity, lower than in a similar multilayer having equivalent functional layer thickness and coatings. Said multilayer may or may not undergo one (or more) high-temperature heat treatment(s) of the bending, toughening or annealing type, but if it does undergo one (or more) such treatment(s), its optical quality and mechanical integrity will be preserved.

Thus, the subject of the invention, in its broadest acceptance, is a substrate, especially a transparent glass substrate, provided with a thin-film multilayer comprising a functional layer having reflection properties in the infrared and/or in solar radiation, especially a metallic functional layer based on silver or on a metal alloy containing silver, and two coatings, said coatings being composed of a plurality of dielectric layers, so that the functional layer is placed between two coatings, the functional layer being deposited on a wetting layer itself deposited directly onto a subjacent coating, characterized in that the subjacent coating comprises at least one dielectric layer based on nitride, especially on silicon nitride and/or aluminum nitride, and at least one noncrystalline smoothing layer made from a mixed oxide, said smoothing layer being in contact with said superjacent wetting layer.

Thus, the invention consists in providing a noncrystalline smoothing layer under the wetting layer which is crystalline in order to allow suitable growth of the functional layer located on top of this wetting layer, which smoothing layer is in contact with the wetting layer directly or via an underblocking coating.

It has appeared that in the case where the subjacent coating comprises at least one dielectric layer based on nitride, especially on silicon nitride and/or aluminum nitride, choosing a noncrystalline smoothing layer made from a mixed oxide made it possible to obtain good resistivity of the multilayer and optical properties suitable for the expectations whether or not the substrate undergoes a heat treatment after deposition.

The invention thus applies to substrates known as "toughened or untoughened" substrates insofar as it is possible, on the same building façade for example, to place near each other glazing that integrate toughened substrates and untoughened substrates, without it being possible to distinguish them from one another by simple visual observation of the color in reflection and of the light reflection.

Within the meaning of the present invention, when it is stated that a deposition of a layer or a coating (comprising one or more layers) is carried out directly under or directly on another deposit, it means that no other layer can be interposed between these two deposits.

The smoothing layer is said to be "noncrystalline" in the sense that it can be completely amorphous or partially amorphous, and thus partially crystalline, but that it cannot be completely crystalline over its entire thickness. It may be of metallic nature as it is based on a mixed oxide (a mixed oxide is an oxide of at least two elements).

The crystallographic appearance of the smoothing layer is inevitably different from that of the wetting layer since the smoothing layer is noncrystalline whereas the wetting layer is, for the most part, crystalline; they can therefore not be confused from this point of view.

The advantage of such a smoothing layer is to make it possible to obtain an interface with the directly superjacent wetting layer that is not very rough. This low roughness can furthermore be seen with a transmission electron microscope.

Furthermore, the wetting layer has a better texture and, in addition, has a preferential crystallographic orientation that is more pronounced.

Each smoothing layer is thus made of a different material, differing both from a crystallographic and stoichiometric point of view, from that of the wetting layer under which it is directly placed.

The nitride-based layer of the subjacent coating, which in addition comprises the smoothing layer, is in contact with the substrate, directly or indirectly via a contact layer, for example based on titanium oxide ($TiO_2$).

The index of this nitride-based layer is, preferably, less than 2.2.

Preferably, the smoothing layer is a mixed oxide layer based on an oxide of one or more of the following metals: Sn, Si, Ti, Zr, Hf, Zn, Ga, In and more precisely a layer of a mixed oxide based on zinc and tin or a layer of a mixed indium tin oxide (ITO) deposited at low temperature.

The index of the smoothing layer is, preferably, less than 2.2.

Preferably, in addition, the smoothing layer is a mixed oxide layer having a nonstoichiometric amount of oxygen and even more particularly a substoichiometric mixed oxide layer based on zinc and tin, doped with antimony ($SnZnO_x$:Sb, x being a number).

Furthermore, the smoothing layer preferably has a geometric thickness between 0.1 and 30 nm and more preferably between 0.2 and 10 nm.

In a preferred variant, at least one blocking coating is based on Ni or on Ti or is based on an Ni-based alloy, and especially is based on an NiCr alloy.

In addition, the wetting layer subjacent to the functional layer is, preferably, based on zinc oxide; this wetting layer may be, in particular, based on aluminum-doped zinc oxide.

The geometric thickness of the wetting layer is preferably between 2 and 30 nm and more preferably between 3 and 20 nm.

The glazing according to the invention incorporates at least the substrate carrying the multilayer according to the invention, optionally combined with at least one other substrate. Each substrate may be clear or tinted. At least one of the substrates may especially be made of bulk-tinted glass. The choice of coloration type will depend on the level of light transmission and/or on the calorimetric appearance that is desired for the glazing once its manufacture has been completed.

Thus, for glazing intended to equip vehicles, some standards dictate that windshields should have a light transmission $T_L$ of about 75%, while other standards impose a light transmission $T_L$ of about 65%; such a level of transmission is not required for the side windows or the sunroof for example. The tinted glass that can be used is for example that which, for a thickness of 4 mm, has a $T_L$ of 65% to 95%, an energy transmission $T_E$ of 40% to 80%, a dominant wavelength in transmission of 470 nm to 525 nm, associated with a transmission purity of 0.4% to 6% under illuminant $D_{65}$, which may "result" in the (L, a*, b*) colorimetry system, in a* and b* values in transmission of between −9 and 0 and between −8 and +2 respectively.

For glazing intended to equip buildings, the glazing preferably has a light transmission $T_L$ of at least 75% or higher in the case of "low-emissivity" applications, and a light transmission $T_L$ of at least 40% or higher for "solar control" applications.

The glazing according to the invention may have a laminated structure, especially one combining at least two rigid substrate of the glass type with at least one sheet of thermoplastic polymer, so as to have a structure of the type: glass/thin-film multilayer/sheet(s)/glass. The polymer may especially be based on polyvinyl butyral (PVB), ethylene/vinyl acetate (EVA), polyethylene terephthalate (PET) or polyvinyl chloride (PVC).

The glazing may also have what is called an asymmetric laminated glazing structure, which combines a rigid substrate of the glass type with at least one sheet of polymer of the polyurethane type having energy-absorbing properties, optionally combined with another layer of polymers having "self-healing" properties. For further details about this type of glazing, the reader may refer especially to patents EP-0 132 198, EP-0 131 523, EP-0 389 354.

The glazing may therefore have a structure of the type: glass/thin-film multilayer/polymer sheet(s).

The glazing according to the invention is capable of undergoing a heat treatment without damaging the thin-film multilayer. The glazing is therefore possibly curved and/or toughened.

The glazing may be curved and/or toughened when consisting of a single substrate, that provided with the multilayer. It is then referred to as "monolithic" glazing. When the glazing is curved, especially for the purpose of making windows for vehicles, the thin-film multilayer is preferably on an at least partly nonplanar face.

The glazing may also be a multiple glazing unit, especially a double-glazing unit, at least the substrate carrying the multilayer being curved and/or toughened. It is preferable in a multiple glazing configuration for the multilayer to be placed so as to face the intermediate gas-filled space. In a laminated structure, the substrate carrying the multilayer is preferably in contact with the sheet of polymer.

When the glazing is monolithic or is in the form of multiple glazing of the double-glazing or laminated glazing type, at least the substrate carrying the multilayer may be made of curved or toughened glass, it being possible for this substrate to be curved or toughened before or after the multilayer has been deposited.

The invention also relates to a process for manufacturing substrates according to the invention, which consists in depositing the thin-film multilayer on its substrate by a vacuum technique of the sputtering, optionally magnetically enhanced sputtering, type and then in carrying out a heat treatment of the bending, toughening or annealing type on the coated substrate without degrading its optical and/or mechanical quality.

However, it is not excluded for the first layer or first layers of the multilayer to be able to be deposited by another technique, for example by a thermal decomposition technique of the pyrolysis type.

The details and advantageous features of the invention will become apparent from the following nonlimiting examples, illustrated by means of the attached figures.

In the figures illustrating the multilayers, the thicknesses of the various materials have not been drawn strictly to scale in order to make them easier to understand.

Furthermore, in all the examples below the thin-film multilayer is deposited on a substrate 10 made of soda-lime glass having a thickness of 2 mm.

In each case where a heat treatment was applied to the substrate, this was an annealing treatment for around 5 minutes at a temperature of around 660° C. followed by cooling in ambient air (around 20° C.).

Figure 3:
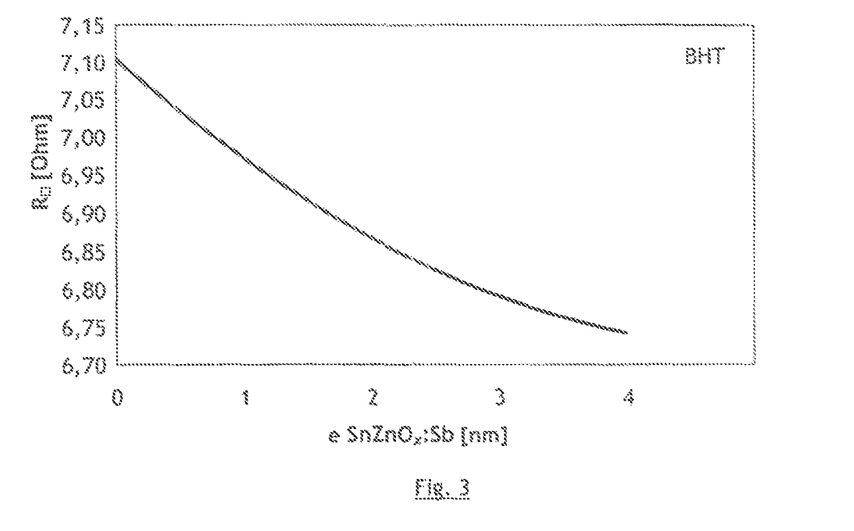
FIG. 3 illustrates the change, before heat treatment, in the sheet resistance of a multilayer having a single functional layer provided with a coating having a single overblocking layer as a function of the thickness of the smoothing layer.
Figure 4:
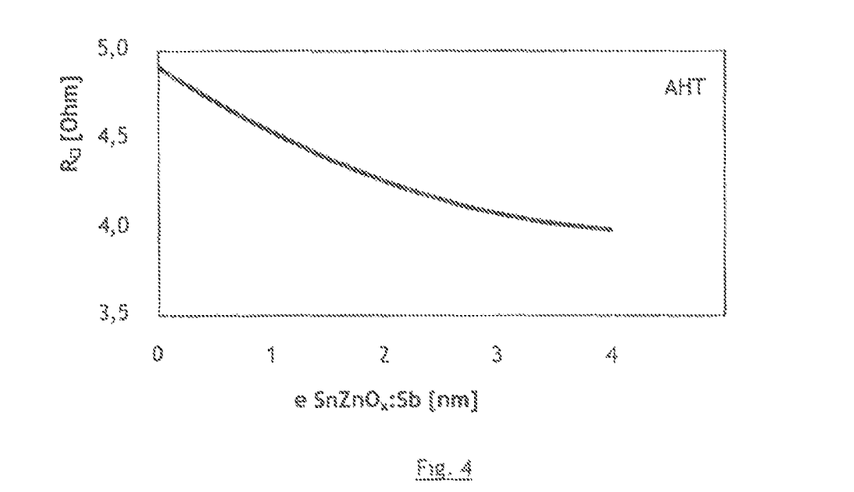
FIG. 4 illustrates the change, after heat treatment, in the sheet resistance of the same multilayer having a single functional layer as in FIG. 3, as a function of the thickness of the smoothing layer.
Figure 5:
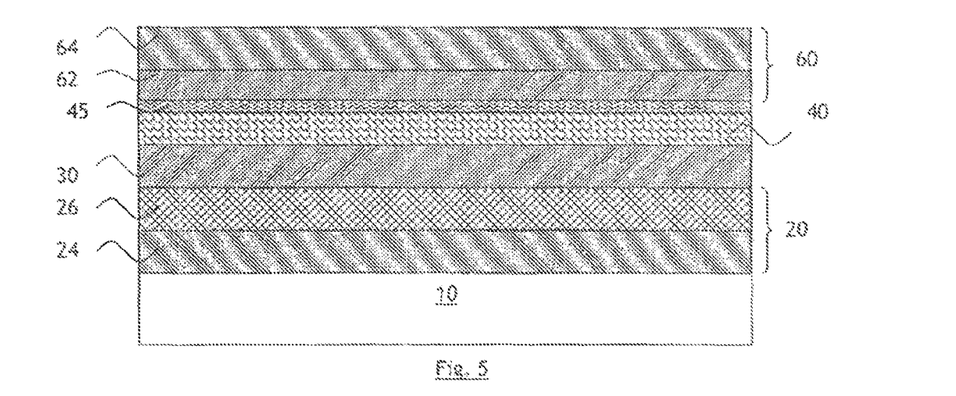
FIG. 5 illustrates a multilayer having a single functional layer according to the invention, the functional layer being provided with an overblocking coating but not an underblocking coating.

The objective of FIGS. 1 to 4 is to illustrate the importance of the presence of the smoothing layer in a multilayer of the type of that illustrated in FIG. 5, which shows a multilayer according to the invention.

Figure 1:
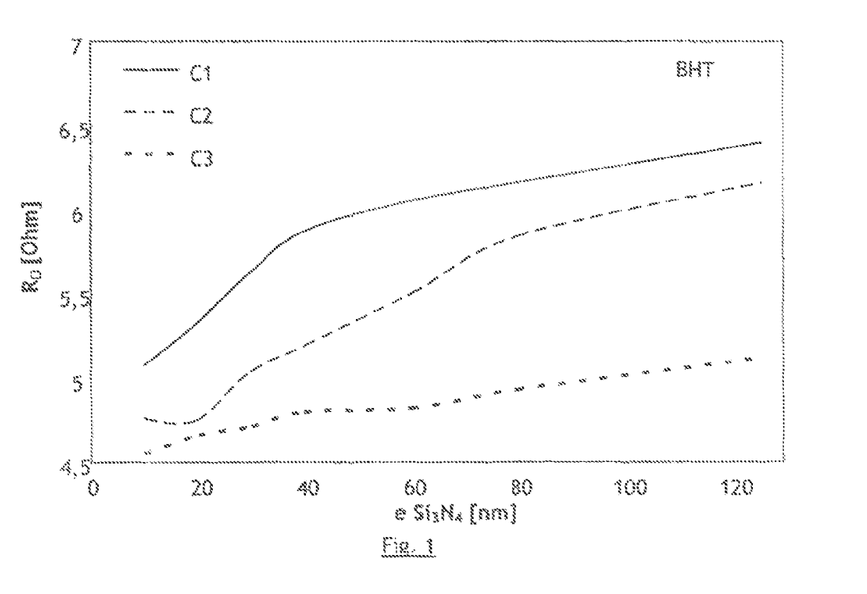
FIG. 1 illustrates the change, before heat treatment, in the sheet resistance of a multilayer having a single functional layer provided with a coating having a single overblocking layer, with and without a smoothing layer, as a function of the thickness of the dielectric layer placed underneath.
Figure 2:
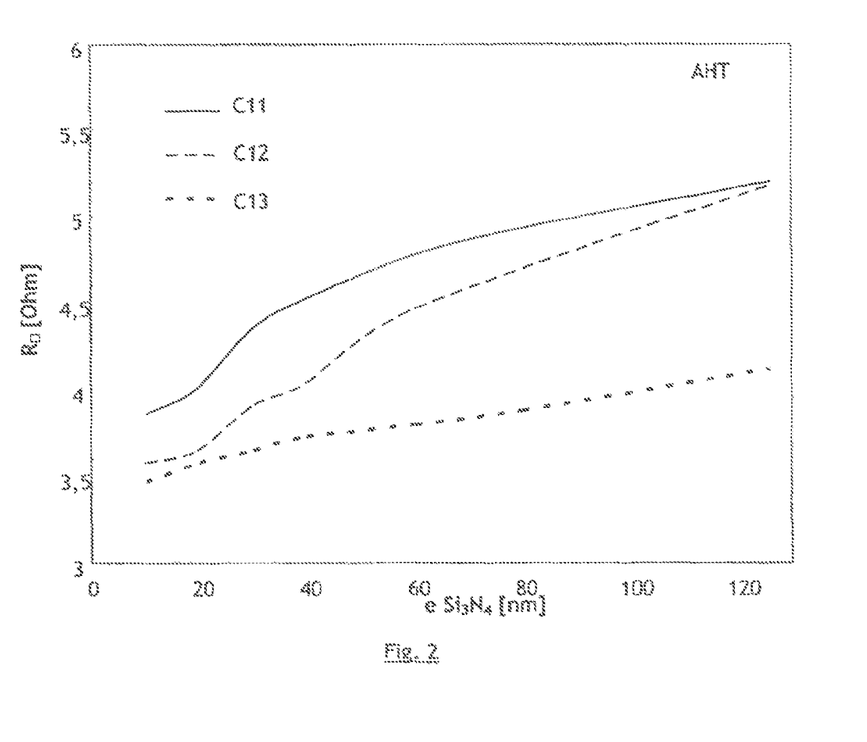
FIG. 2 illustrates the change, after heat treatment, in the sheet resistance of the same multilayer having a single functional layer as in FIG. 1, with and without a smoothing layer, as a function of the thickness of the dielectric layer placed underneath.

An example, numbered 1, of a multilayer having a single functional layer according to the invention is of the type:

Substrate/$Si_3N_4$/$SnZnO_x$:Sb/ZnO/Ag/Ti/ZnO/$Si_3N_4$ Variable/Variable/8 nm/10 nm/2 nm/8 nm/20 nm In FIGS. 1 and 2, the curves C1 and C11 illustrate the change in the sheet resistance (in ohms) of the multilayer as a function of the thickness of the dielectric layer based on silicon nitride (e $Si_3N_4$) in contact with the substrate, before (BHT) and after (AHT) heat treatment respectively, when the multilayer is not provided with a smoothing layer.

The curves C2 and C12 illustrate the change in the sheet resistance (in ohms) of the multilayer as a function of the thickness of the dielectric layer based on silicon nitride (e $Si_3N_4$) in contact with the substrate, before and after heat treatment respectively, when the multilayer is provided with a smoothing layer made from $SnZnO_x$:Sb having a thickness of 6 nm (x denotes a non-zero number).

The curves C3 and C13 illustrate the change in the sheet resistance (in ohms) of the multilayer as a function of the thickness of the dielectric layer based on silicon nitride (e $Si_3N_4$) in contact with the substrate, before and after heat treatment respectively, when the multilayer is provided with a smoothing layer based on $SnZnO_x$:Sb having a thickness of 20 nm.

As can be seen in these FIGS. 1 and 2, for the same thickness of dielectric layer in contact with the substrate (for example 20 nm), the sheet resistance of the multilayer is always lower—therefore better—for curves C2, C3, C12 and C13 when the multilayer comprises a smoothing layer based on $SnZnO_x$:Sb between the dielectric layer based on silicon nitride in contact with the substrate and the wetting layer based on zinc oxide ZnO subjacent to the functional layer based on silver Ag and the sheet resistance of the multilayer is always lower for a smoothing layer thickness of 20 nm (curves C3 and C13).

It was verified that the smoothing layer made from a mixed oxide is amorphous throughout its thickness, whereas the wetting layer and the metallic functional layer are both crystalline, throughout their thickness.

Consequently, the presence of the smoothing layer significantly improves the sheet resistance of the multilayer for comparable thickness of the subjacent dielectric layer, and this improvement is even greater when the thickness of the smoothing layer is Large.

In FIGS. 3 and 4, the curves illustrate the change in the sheet resistance (in ohms) of the multilayer as a function of the thickness of the smoothing layer based on zinc and tin oxide doped with antimony (e $SnZnO_x$:Sb), before (BHT) and after (AHT) heat treatment respectively, when the multilayer is provided with a 20 nm layer based on silicon nitride $Si_3N_4$ between the substrate and the layer based on $SnZnO_x$:Sb.

It was also verified that the smoothing layer made from a mixed oxide is amorphous throughout its thickness, whereas the wetting layer and the metallic functional layer are both crystalline, throughout their thickness.

As can be seen in these FIGS. 3 and 4 also, the presence of the smoothing layer significantly improves the sheet resistance of the multilayer for a smoothing layer with a thickness between >0 and 4 nm, and this improvement is even greater when the thickness of the smoothing layer is large.

Similar observations may be made with a multilayer having a single functional layer provided with an underblocking coating and without an overblocking coating or provided with an underblocking coating and with an overblocking coating.

Another series of tests was carried out.

Three examples, numbered 2, 3 and 4, were produced based on the multilayer structure having a single functional layer illustrated in FIG. 5, in which the functional layer 40 is provided with an overblocking coating 45.

Table 1 below illustrates the thicknesses in nanometers of each of the layers:

TABLE 1

| Layer | Material | Ex. 2 | Ex. 3 | Ex. 4 |
|---|---|---|---|---|
| 64 | $Si_3N_4$ | 40 | 40 | 40 |
| 62 | ZnO | 10 | 10 | 10 |
| 45 | Ti | 2 | 2 | 2 |
| 40 | Ag | 10 | 10 | 10 |
| 30 | ZnO | 10 | 10 | 10 |
| 26 | $SnZnO_x$:Sb | — | — | 10 |
| 24 | $Si_3N_4$ | 30 | 30 | 20 |

The resistivity, optical and energy characteristics of these examples are given in Table 2 below:

TABLE 2

| Ex. | R (ohms) | $R_L$ (%) | $T_L$ (%) | a* (D65) | b* (D65) | E (%) |
|---|---|---|---|---|---|---|
| 2 BHT | 5.7 | 4.4 | 86.5 | 2.3 | −5.2 | 6 |
| 2 AHT | — | — | — | — | — | — |
| 3 BHT | 6.9 | 4.4 | 85.6 | 2.9 | −7.8 | 8 |
| 3 AHT | 5.2 | 4.5 | 87.1 | 6.5 | −6 | 6 |
| 4 BHT | 5.8 | 5.7 | 87 | 1.3 | −3.5 | 6 |
| 4 AHT | 4.3 | 4.3 | 88.7 | 3.3 | −5.7 | 5 |

Thus, the resistivity of the multilayer both before and after heat treatment of example 4 according to the invention is still lower than the counterexamples 3 and 2 respectively.

Furthermore, the light reflection $R_L$, the light transmission $T_L$ measured under illuminant $D_{65}$ and the colors in reflection a* and b* in the LAB system measured under illuminant $D_{65}$ on the side of the layers do not vary very significantly between the example according to the invention and the counterexamples 3 and 2.

By comparing the optical and energy characteristics before heat treatment with these same characteristics after heat treatment, no major degradation was observed.

Figure 6:
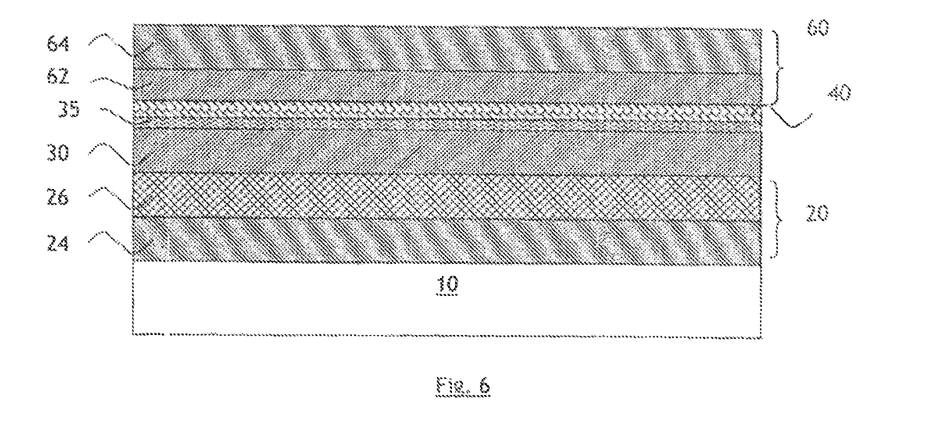
FIG. 6 illustrates a multilayer having a single functional layer according to the invention, the functional layer being provided with an underblocking coating but not with an overblocking coating.

Other tests were carried out based on the multilayer structure having a single functional layer illustrated in FIG. 6, in which the functional layer 40 is provided with an overblocking coating 45 but not with an underblocking coating 35.

Figure 7:
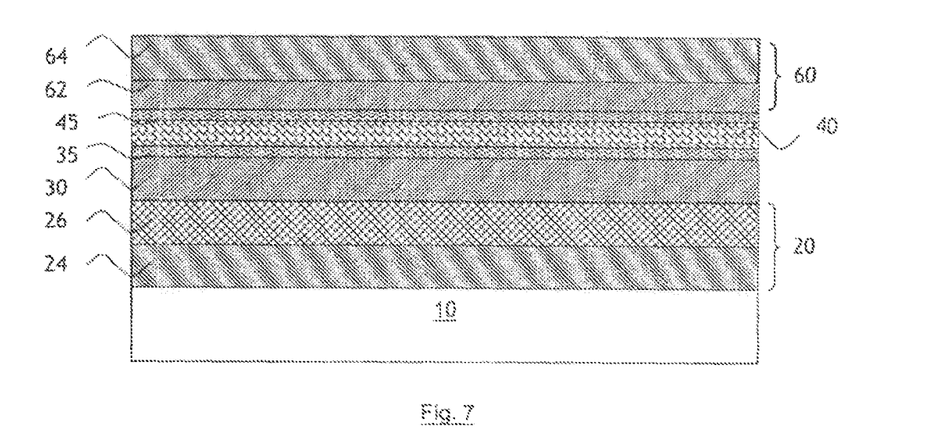
FIG. 7 illustrates a multilayer having a single functional layer according to the invention, the functional layer being provided with an underblocking coating and with an overblocking coating.

Other tests were carried out based on the multilayer structure having a single functional layer illustrated in FIG. 7, in which the functional layer 40 is provided with an underblocking coating 35 and with an overblocking coating 45.

All these tests led to similar observations.

In addition, tests were conducted in order to measure the roughness of the layers.

Table 3 below illustrates the roughness measured by X-ray reflectometry and expressed in nm (the roughness of the substrate being around 0.4):

TABLE 3

| Layer(s) | Thickness (nm) of the layers | Roughness σ (nm) |
|---|---|---|
| $Si_3N_4$ | 28.5 | 1.1 |
| Glass | Substrate | |
| $SnInO_x$ | 29.5 | 0.8 |
| Glass | Substrate | |
| $SnZnO_x$:Sb | 32.0 | 0.7 |
| Glass | Substrate | |
| $SnZnO_x$:Sb | 11.2 | 0.8 |
| $Si_3N_4$ | 19.7 | 0.5 |
| Glass | Substrate | |
| $SnInO_x$ | 10.4 | 0.8 |
| $Si_3N_4$ | 19.3 | 0.5 |
| Glass | Substrate | |

As can be seen in this table, the roughness of the layer based on silicon nitride $Si_3N_4$ deposited alone on the glass is high, but the final roughness of a multilayer comprising a layer based on indium tin oxide $SnInO_x$ (ITO) or a layer based on a mixed zinc tin oxide $SnZnO_x$:Sb deposited on the layer based on silicon nitride is lower. The wetting layer based on a mixed oxide thus makes it possible to improve the roughness of the interface in contact with the wetting layer, by reducing this roughness.

The present invention has been described above by way of example. It will be understood that a person skilled in the art is capable of producing various alternative forms of the invention without thereby departing from the scope of the patent as defined by the claims.

The invention claimed is:

1. A transparent glass substrate, comprising a thin film multilayer comprising, in the following order from the substrate:
    a first dielectric layer based on silicon nitride and/or aluminum nitride and having a geometric thickness from 10 to 120 nm;
    a noncrystalline smoothing layer based on zinc and tin, optionally doped, and having a geometric thickness from 6 to 30 nm;
    a wetting layer based on zinc oxide and having a geometric thickness from 2 to 30 nm;
    a functional layer having reflection properties in the infrared and/or in solar radiation and based on silver or on a metal alloy comprising silver; and
    a second dielectric layer based on a metal oxide or metal nitride,
    wherein the smoothing layer is in direct contact with the first dielectric layer and the wetting layer,
    wherein the functional layer is direct contact with the wetting layer, and
    wherein the functional layer and the wetting layer are both crystalline throughout their thicknesses.

2. The transparent glass substrate as claimed in claim 1, wherein the smoothing layer comprises a nonstoichiometric amount of oxygen.

3. The transparent Mass substrate as claimed in claim 1, wherein the smoothing layer has a geometric thickness between 6 and 20 nm.

4. The transparent glass substrate as claimed in claim 1, wherein the functional layer is positioned directly under at least one superjacent blocking coating.

5. The transparent glass substrate as claimed in claim 4, wherein the at least one superjacent blocking coating is based on Ni or on Ti.

6. The transparent glass substrate as claimed in claim 4, wherein the at least one superjacent blocking coating is based on a Ni alloy.

7. The transparent glass substrate as claimed in claim 6, wherein the at least one superjacent blocking coating is based on an NiCr alloy.

8. The transparent glass substrate as claimed in claim 1, Wherein the wetting layer has a geometric thickness of between 3 and 20 nm.

9. The transparent glass substrate of claim 1, wherein the at least one noncrystalline smoothing layer is amorphous throughout its thickness.

10. The transparent glass substrate as claimed in claim 1, wherein:
    the first dielectric layer is based on silicon nitride;
    the smoothing layer is a substoichiometric mixed oxide layer based on zinc and tin and doped with antimony, and the smoothing layer has a geometric thickness between 6 and 20 nm;
    the wetting layer has a geometric thickness from 3 to 20 nm;
    the functional layer is based on silver; and
    the second dielectric layer is based on silicon nitride.

11. The transparent glass substrate as claimed in claim 10, wherein the first dielectric layer is in direct contact with the substrate.

12. The transparent glass substrate as claimed in claim 1, wherein the first dielectric layer is in direct contact with the substrate.

13. A glazing unit comprising at least one transparent Mass substrate as claimed in claim 1, and at least one other substrate.

14. The glazing unit as claimed in claim 13, mounted in monolithic form or as multiple glazing of the double glazing or laminated glazing type, wherein at least the substrate carrying the multilayer is curved or toughened.

15. A process for manufacturing the transparent glass substrate as claimed in claim 1, comprising depositing the thin film multilayer on the substrate by a vacuum technique of the sputtering, optionally magnetron sputtering, type and then in that a heat treatment of the bending, toughening or annealing type is carried out on said substrate without degrading its optical and/or mechanical quality.

* * * * *